(12) United States Patent
Quinn (10) Patent No.: US 7,296,495 B2
(45) Date of Patent: ***Nov. 20, 2007

(54) MECHANICAL SYSTEM FOR POWER CHANGE BETWEEN THE INPUT AND OUTPUT THEREOF

(75) Inventor: Todd C Quinn, Des Moines, WA (US)

(73) Assignee: Quinn Industries LLC, Seattle, WA (US)

( * ) Notice: Subject to any disclaimer, the term of this patent is extended or adjusted under 35 U.S.C. 154(b) by 174 days.

This patent is subject to a terminal disclaimer.

(21) Appl. No.: 11/005,399

(22) Filed: Dec. 6, 2004

(65) Prior Publication Data

US 2006/0117884 A1   Jun. 8, 2006

(51) Int. Cl.
*F16H 33/00* (2006.01)
*F16H 35/00* (2006.01)
*F16H 37/00* (2006.01)
*F16H 37/06* (2006.01)
*F16H 57/08* (2006.01)

(52) U.S. Cl. .................. 74/640; 475/330; 475/903; 475/337

(58) Field of Classification Search .............. 475/330, 475/331, 337, 341, 903, 255
See application file for complete search history.

(56) References Cited

U.S. PATENT DOCUMENTS

| 1,773,535 | A | * | 8/1930 | Lane | 475/255 |
|---|---|---|---|---|---|
| 3,008,355 | A | * | 11/1961 | Grudin | 475/334 |
| 5,679,089 | A | * | 10/1997 | Levedahl | 475/332 |
| 5,800,305 | A | * | 9/1998 | Ra | 475/343 |
| 6,402,653 | B1 | * | 6/2002 | Jensen | 475/149 |
| 6,749,533 | B2 | * | 6/2004 | Norman | 475/337 |
| 6,827,665 | B1 | * | 12/2004 | Prestridge | 475/337 |

* cited by examiner

*Primary Examiner*—Tisha Lewis
(74) *Attorney, Agent, or Firm*—Jensen & Pintigam P.S.

(57) ABSTRACT

The system includes at least two power disc elements, each mounted for rotation on a central shaft which is typically fixed. The first power disc element includes a first peripheral gear portion by which the first power disc element may be turned by an input assembly. The first power disc element has a second gear portion which may have a substantially smaller diameter than the outside diameter thereof. A second power disc portion has a plurality of outer drive gears mounted for rotation to mate with the second peripheral gear portion on the first power disc element. A central gear, which may be substantially larger than the outer drive gears, is positioned to mate with the outer drive gear in the the second power disc element. The second power disc element drives an output assembly.

15 Claims, 8 Drawing Sheets

MECHANICAL SYSTEM FOR POWER CHANGE BETWEEN THE INPUT AND OUTPUT THEREOF

TECHNICAL FIELD

This invention relates generally to a system for supplying power at an output in response to an input source thereof, and more particularly concerns such a system which produces a power change between the input and outputs thereof.

BACKGROUND OF THE INVENTION

The generation of power, and correspondingly, machines which use power to produce work, such as by the turning of a shaft by electric power, are quite important to modern industry and society. Electric power is used to run a large number of machines which vary substantially in output capability, depending upon the task, from less than one horsepower to several thousand horsepower and even greater, to accomplish specific tasks. Electric power is also used to power electric lights and many electric appliances.

The sources of electric power also vary widely, including large electric power generating plants using, for instance, hydroelectric capability, fossil and/or nuclear fuels, among others. Electric power produced by such plants is then supplied to individual users, through large, complex and expensive transmission and distribution systems. Power is lost in the transmission and distribution system. Alternatively, small, stand-alone electric power sources such as electric generators or micro turbines, which are typically run by fossil fuel (gasoline) engines, natural gas turbines or other similar devices, are capable of supplying small amounts of power for specific users. These generators are also not 100% efficient.

Electric motors are also less than 100% efficient, as are systems using electric power directly, such as lighting systems. Some energy is lost in carrying out specific work, i.e. turning a shaft or lighting a filament in a bulb, for instance. Efficiencies of modern electric motors can be quite high, however, exceeding 90%. It is desirable that electric motors or similar devices have efficiencies as high as possible, and further, it is desirable to produce electric power using as little energy as possible. Historically, it has been a goal to actually be able to increase electric power from input to output, although this has not been heretofore realized.

Furthermore, it is highly desirable to have a capacity of local sources of electric power, particularly inexpensive power, independent of existing power distribution systems, without the requirement of large supplies of fuel, such as fossil fuel in particular. One example is for powering irrigation systems in, for instance, third world countries, where the cost of energy to run such systems adds significantly to the cost of food production. Economic electric-powered vehicles are also desirable and are another example where system improvements would be advantageous to the environment.

SUMMARY OF THE INVENTION

Accordingly, the present invention includes at least two power disc elements mounted for rotation about a central axis, wherein the first power disc element includes a first peripheral portion in the vicinity of the rim thereof by which the first power disc element is turned; a first system gear, mounted on a first system shaft which is offset from the central axis; wherein the first power disc element has a second peripheral gear portion in the vicinity of a forwardly extending rim portion of the power element, and wherein the second power disc element has a plurality of outer drive gear members rotatably mounted to a rear surface thereof and positioned so as to mate with the second peripheral gear portion on the first power element; a central gear which is mounted so as to be fixed relative to the central axis and which is further mounted to mate with the outer drive gears on the second power disc element, such that rotation of the first system gear by a motor results in rotation of the first and second power disc members; and a second system gear mating with a peripheral gear portion of the second power disc element, located in the vicinity of the rim of the second power disc element, the second system gear mounted on a second system shaft which is offset from the central axis, wherein in operation a power change results between first and second system shafts.

BEST MODE FOR CARRYING OUT THE INVENTION

Figures 1, 2:
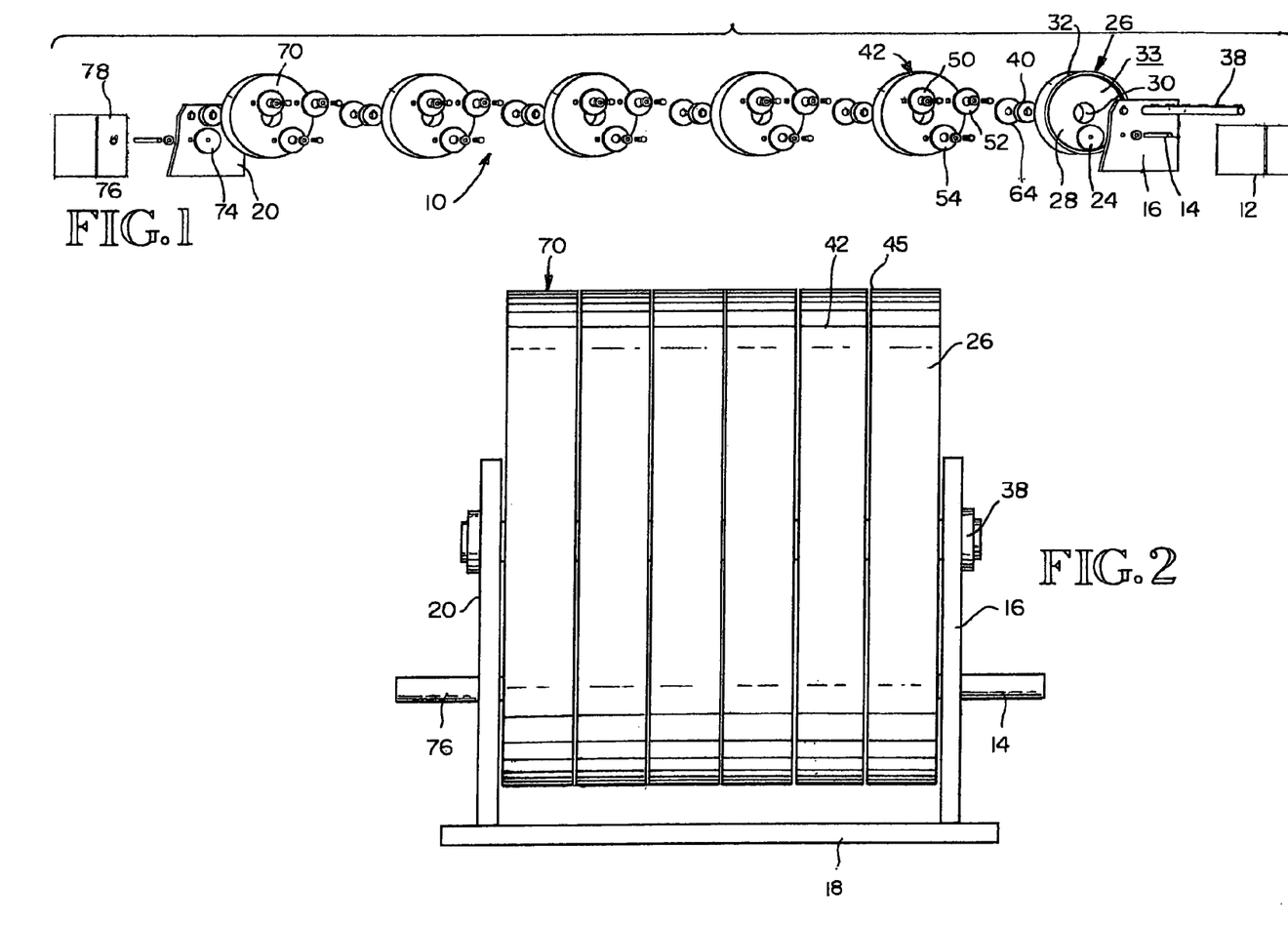
FIG. 1 is an exploded view of the power system of the present invention.
FIG. 2 is a side elevational view of the system of the present invention.
Figure 3:
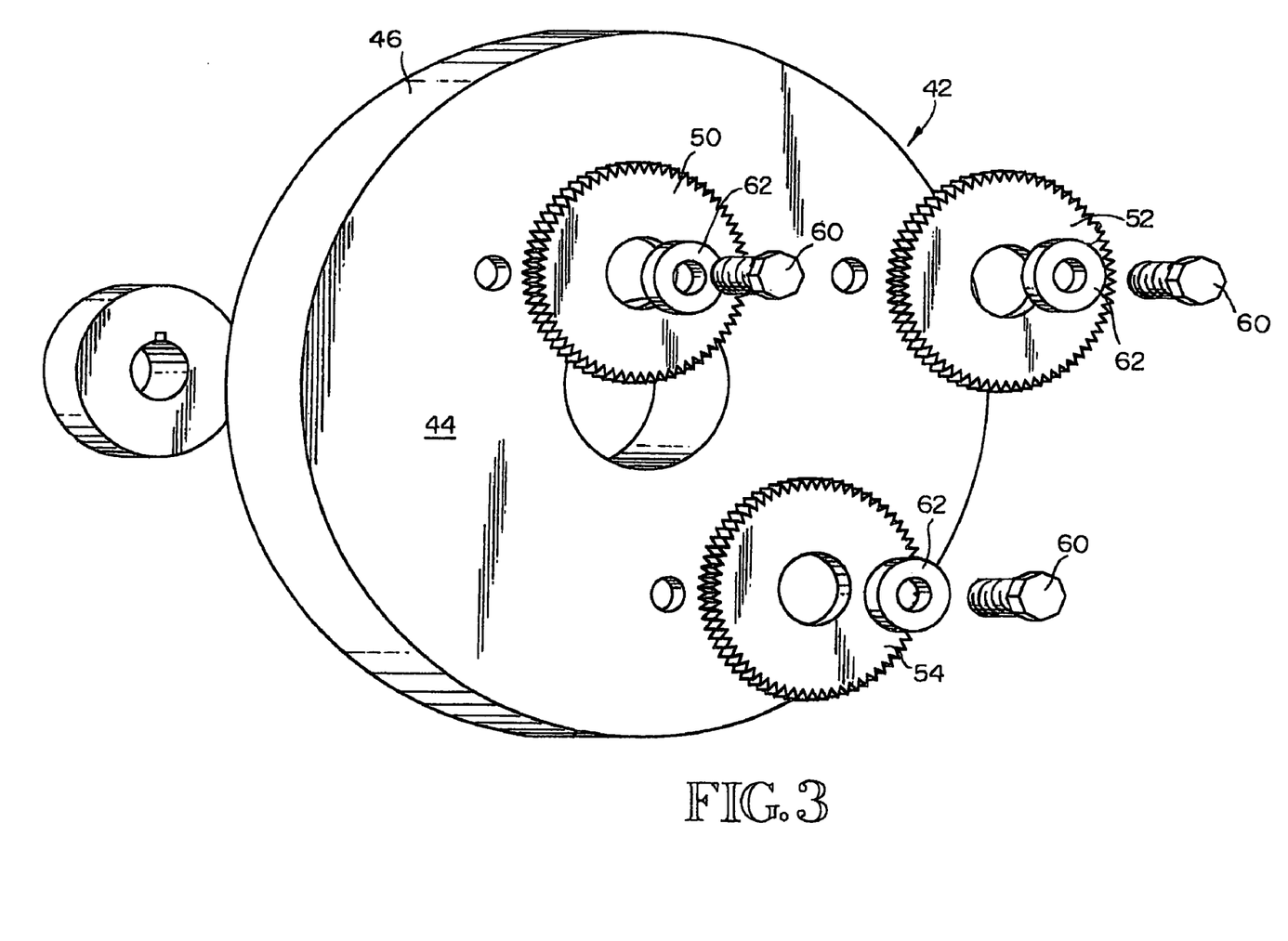
FIG. 3 is an exploded view of a portion of the system of the present invention.
Figure 4:
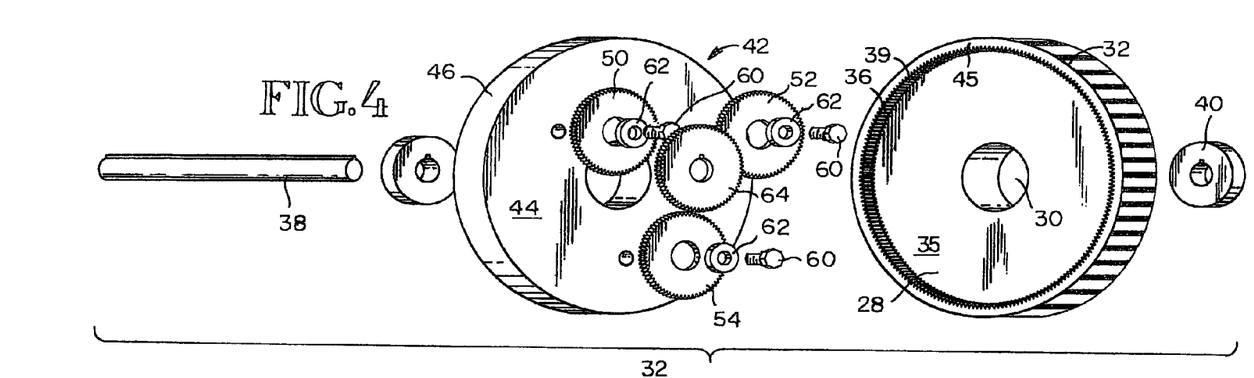
FIG. 4 is an exploded view of another portion of the system of the present invention.
Figure 5:
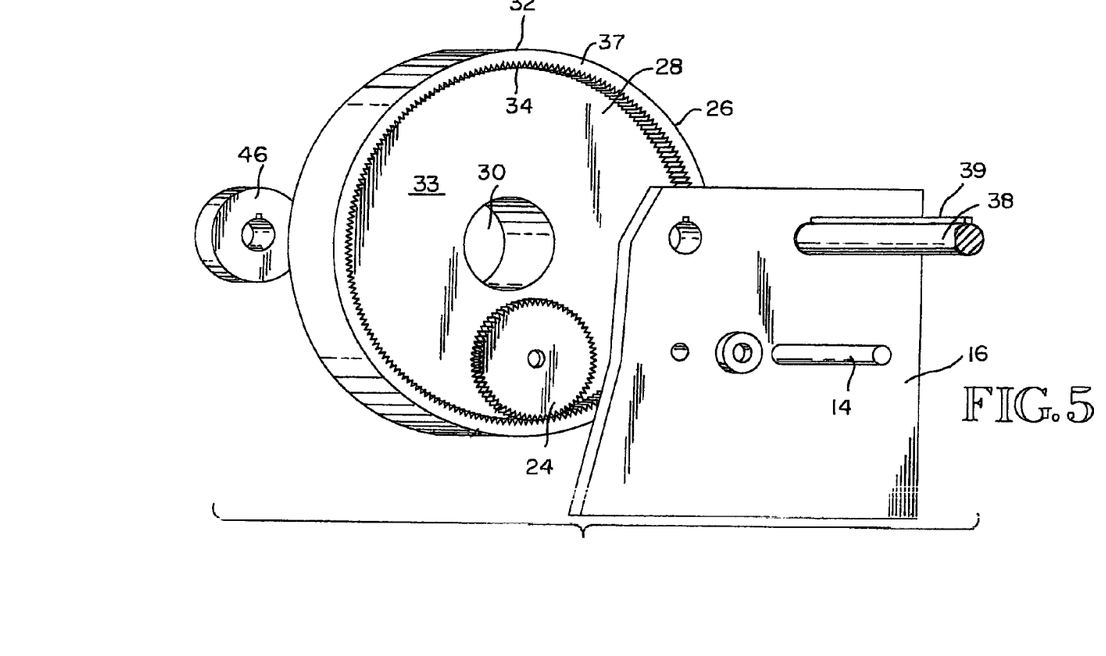
FIG. 5 is an exploded view of another portion of the system of the present invention.

The system of the present invention, shown generally in one embodiment at 10 in FIG. 1, produces an efficient power change between the input and output ends of the system. The system, generally shown at 10, is driven by a conventional electric motor 12 at one end of the system 10 in FIG. 1. Other power sources could also be used, including a gas or diesel engine system or other power systems. In the embodiment shown, electric motor 12 is relatively small, i.e. a two horsepower, single-phase motor, operating at 110 volts. However, it should be understood that the input motor could be significantly larger and/or could be a three-phase motor operating at 220 volts. The characteristics of the drive motor are not critical to the present invention.

Electric motor 12 includes a conventional output shaft 14, also referred to herein as a system input power shaft, which extends through a first fixed support bracket 16. Support bracket 16 supports the present power system at one end thereof and extends upwardly from a base support member 18 (FIG. 2). At the other end of the system 10 is a second support bracket 20. The support arrangement (elements 16, 18 and 20 in the present system) can vary widely in configuration and structure, depending upon the particular arrangement of the power system 10 itself.

Referring now to FIGS. 1-5, mounted on the free end of system input power shaft 14 of electric motor 12 is an input drive gear 24. In the embodiment shown, input drive gear 24 drives an input power disc 26. The input power disc 26 in the embodiment shown is circular, approximately 18 inches in diameter, and includes a central portion 28 with a central axial opening 30 and a rim portion 32 which extends perpendicularly from central portion 28 both from a rear surface 33 of central portion 28 and an opposing forward surface 35 of the central portion. In the embodiment shown, the rim portion in both rear and forward directions is approximately 2-½ inches wide, with first and second sets of gear teeth 34, 36 on the inner surfaces of rear section 37 and the forward section 39 of the rim portion 32.

The input drive gear 24 in the embodiment shown is 6 inches in diameter, has 66 teeth and is positioned to mate with gear teeth set 34 on the rear section 37 of rim portion 32 of the input power disc 26, because the output shaft 14 of the motor 12 is offset from the center of the input power disc 26.

The input power disc 26 is mounted for rotation on a main shaft 38, which is also supported at opposing ends thereof by supporting brackets 16 and 20. Power disc 26 is mounted by a key 39 on shaft 38 to a bearing 40 which is positioned in axial center opening 30 in the central portion of the power disc. The keying of the central shaft to bearing 40 is not critical but does reduce possible wear due to undesired rotation of the bearing. Bearing 40 in this embodiment does not rotate, but permits input power disc 26 to rotate freely on the bearing relative to the main shaft. As discussed below in more detail, in some arrangements, main shaft 38 can rotate to some extent to achieve particular system results.

In operation, shaft 14 from motor 12 will rotate the input drive gear 24, which will rotate the input power disc 26 about main shaft 38, in particular bearing 40. The speed of rotation of the input power disc 26 depends upon the rotation of shaft 14 and the relative size ratio between input drive gear 24 and power disc 26 (with the gear set 34 on input power disc 26 being at its rim). For instance, if the power shaft 14 rotates at 1786 rpm (the rating of motor 12), when input drive gear 24 is 6 inches in diameter and power disc 26 is 18 inches in diameter (3:1 ratio), the first power disc will rotate at 595-⅓ rpm.

A first intermediate power disc 42 follows input power disc 26, and is also mounted on main shaft 38 through bearing 43, which is keyed to main shaft 38. The first intermediate power disc 42 has a flat rear surface 44 and a rim portion 46 which extends in the forward direction. Rim portion 46 is identical to the forward section 39 of rim portion 32 on input power disc 26. The first intermediate power disc 42 is otherwise substantially identical to input power disc 26, having the same diameter, configuration and structure thereof, and mounted for rotation on main shaft 38 through bearing 43.

Rotatably mounted to rear surface 44 of first intermediate power disc 42 are three equally spaced outer drive gears 50, 52 and 54. Each of the outer drive gears 50, 52 and 54 are also 6 inches in diameter and have 66 teeth around the periphery thereof, in the embodiment shown. The gears 50, 52 and 54 are mounted for rotation by bolts 60-60 and bearings 62-62. The outer drive gears 50, 52 and 54 are free to rotate in operation about their individual associated bearings 62-62 on bolts 60-60. As a possible alternative structure, there could be two or even just one outer drive gear. Speed of operation may be limited, particularly with just one gear, and the mounting structure might have to be modified to some extent. Mounted at the center of rear surface 44 between, and meshing with, outer drive gears 50, 52 and 54 is a central gear 64, which in the embodiment shown is substantially identical to outer drive gears 50, 52, 54.

Central gear 64 is in the same plane as outer gears 50, 52 and 54. Central gear 64 is keyed to main shaft 38, as are power discs 26 and 42; hence, if main shaft 38 does not rotate, neither does central gear 64, while if main shaft 38 in a particular arrangement does rotate a selected amount, central gear 64 will move therewith. Additional washers, spacers and/or shims may be added to the system, such as for alignment or wear purposes, but are not critical to the invention.

In the embodiment shown, input power disc 26 and the first intermediate disc 42 are made from steel. The central portion of the input power disc is approximately 1-½ inches thick, while the central portion of the intermediate power disc is approximately 2 inches thick. The rim portion of input power disc 26 is approximately 2-½ inches thick, while the rim portion of intermediate power disc 42 is also approximately 2-½ inches thick. It should be understood, however, that the power discs can be made in different sizes, with different materials, including aluminum and even various plastics, which will change the overall weight of the system. Further, while there are three outer drive gears shown, in some configurations there could be two outer drive gears, or in some cases, more than three. In addition, while the outer drive gears are shown to be the same size as the central drive gear in the embodiment shown, it is possible that the central drive gear could be a different size from the outer drive gears. Also, while the input drive gear is one-third the size of the input power disc, in the embodiment shown, a different ratio could be used.

The first intermediate power disc 42 is positioned on shaft 38 relative to the input power disc 26 such that the forward edge 45 of rim portion 32 of input power disc 26 is spaced slightly apart from rear surface 44 of the first intermediate power disc, permitting free rotation thereof, but further such that outer drive gears 50, 52, and 54 on intermediate power disc 42 mesh with gear set 36 on the forward section 39 of rim portion 34 of input power disc 26.

In operation, the rotation of input power disc 26 caused by the driving action of input gear 24 will result in rotation of the outer drive gears 50, 52 and 54 about their associated mounting bolts, and through mechanical interaction with central gear 64 will initiate rotation of the first intermediate power disc 42. The first intermediate power disc 42, the three outer drive gears 50, 52 and 54, and associated mounting bolts and bearings and the central gear 64 keyed to main shaft 38 form a first intermediate power disc assembly.

Successive power disc assemblies, identical to the first power disc assembly in this embodiment, are positioned successively along main shaft 38, with each intermediate power disc assembly interacting with the next successive power disc assembly by the mating of the gear set on the forward rim section of one intermediate power disc with the three outer drive gears in the next successive intermediate power disc assembly. Thus, in the arrangement shown, the rotation of each intermediate power disc will produce rotation of the next intermediate power disc, with the rotation (rpm) speed of each intermediate power disc being approximately one-third lower than that of the previous power disc.

In the embodiment shown in FIG. 1, there are four intermediate power disc assemblies. Following the last intermediate power disc assembly in the system of the present invention is an output power disc 70, which is basically identical to the power disc in the several intermediate power disc assemblies. An output or takeoff gear 74 is mounted on a power shaft 76 of another electrical device, such as for instance a generator 78, positioned at the output end of system 10. Generator 78 can produce electricity. Power shaft 76 is offset from the main drive shaft 38 upon which the individual power discs are rotatably mounted, similarly to the offset of the system input power shaft 14 of motor 12 relative to the main shaft 38. The output gear 74 is in the embodiment shown substantially identical to the input gear 24 in configuration, size and the number of teeth, and is positioned to mate with the gear set on the internal surface of the rim of the power disc 70. A 3:1 ratio thus exists between output power disc 70 and output gear 74, such that output gear 74 has an rpm of three times that of the power disc 70.

In operation, electric motor 12 will drive the system of the present invention at steady-state following a relatively short start-up, during which all of the power discs are brought up successively to steady-state speed. Output/takeoff gear 74 will rotate power shaft 76, driving generator 78 to produce an electric power output.

It should be understood that the arrangement of FIG. 1 is only one embodiment. For instance, in the arrangement of FIG. 1, the input electric motor 12 located at one end of the system results in an output shaft rpm which is less than that of the rpm of the motor, assuming that the input and output gears are the same size, i.e. each successive power disc from the electric motor end to the generator end of the system turns at a decreased speed (⅓ less) than the previous power disc. The motor and the generator, however, could be reversed, such that the speed of the output shaft is greater than the speed of the input electric motor shaft, with an approximately ⅓ increase in speed for each successive power disc assembly in the system. The system of the present invention can be operated advantageously in both directions. In such a case, the output/takeoff gear would be the input gear, driven by the motor, and the input gear would be the takeoff gear, driving a generator or similar device.

Further, while the input gear and the output/takeoff gears mate, respectively, with gear sets on an internal surface of the rims of the input and output power discs, it should be understood that the input drive gear and the output takeoff gear can mate with a gear set on an exterior surface of the rim portion. Hence, gear sets on the internal surfaces of the rim portions of the input and output power discs are not essential to the invention. Other arrangements could be used for providing input power to the system of taking power from the system, including a sprocket drive gear or other means, including belts or fluids or magnetic systems. Use of internal surface gear sets, however, does have an important, unique operating result, in that all the gear sets rotate in the same direction, such that when the system is up to speed, there is almost no drag.

Still further, while the arrangement shows a total of four intermediate gear assemblies, a greater or lesser number can be used, depending upon the amount of power change/advantage desired. At a minimum, however, there must be an input power disc assembly and an output power disc assembly providing a first level of power change/advantage. In such a minimal arrangement, the four intermediate discs shown in FIG. 1 would be eliminated, with the output power disc assembly mating directly with the input power disc assembly. There also could be arrangements where there are more than four intermediate power discs, with each additional power disc assembly being identical to the power disc assembly shown, with the total number of disc assemblies being dependent upon the degree of power/change advantage between the input and output desired.

A number of factors influence the operation and the amount of power change/advantage of the above system. For instance, the relative size difference between the outer drive gears, the size of the power disc to which they are rotatably mounted, and the size of the central drive gear all affect the power change/advantage and/or the speed increase/decrease of the rotation of the successive power discs in the system.

As indicated above, the central shaft in the embodiments shown typically remains fixed, so that the central gear does not rotate in operation of the system. The rotational arrangement and interaction of the outer drive gears and the central gear on the one surface of the power disc results in a force/pressure on the mounting bolts holding the outer drive gears, such that the power disc on which the outer drive gears are mounted begins to rotate in response to rotation of the previous power disc and the mating of its rim gear with the outer drive gears. The mounting shaft can, however, be allowed to rotate to some extent in one direction at startup. The overall power change/advantage of the system would be decreased, depending upon the amount of rotation of the mounting shaft, but startup of the system would be more efficient and take less time.

Further, the mounting shaft and the central gear thereon could be made to rotate slightly in the opposite direction from the power discs, which would increase the power gain from one stage to the other. Typically, there must be a substantial difference between the rotational speed of the outer drive gears and the central gear.

Also, the embodiment shown has a gear ratio of 3:1 between the initial drive gear and the input power disc and a 1:3 ratio between the output power disc and the output/takeoff gear. While these ratios can be varied, change will affect the power advantage. Further, in some cases there may be an additional gear or gears at the output to increase the speed of the output shaft. Since traditional gear system ratios affect power output when they are a part of the input or output of the system, consideration must be given to the specific power requirements of each application. A gear ratio which is too high, for instance 10 times, may negatively affect the power efficiency/advantage of the system.

FIGS. 7-11 show various alternative arrangements for the system of FIGS. 1-6. In particular, various power disc configurations are shown, as well as different arrangements of outer gear drive gears and the central gear for the power discs. It should be understood that these are representative of other additional embodiments. For instance, it should be understood that for the particular arrangements of FIGS. 7-11, when the system includes a plurality of power discs, such as 3 or 4 or more, that the individual power discs can be of varying sizes. This is a possibility with most, if not all, of the various disclosed arrangements. The various gear arrangements disclosed and the varying gear sizes disclosed herein produce a variety of rotational gear speeds, gear advantages and different patterns of rotary motion.

It is possible to choose a particular power disc gear arrangement to produce a desired increase or decrease in the overall rotational effect and desired power change between the input and the output of the system.

The configuration of the outer drive gears and the central gear associated with each power disc can be selected in various combinations, so that virtually any output rotation can be achieved relative to a particular input rotation and vice-versa.

Figure 6:
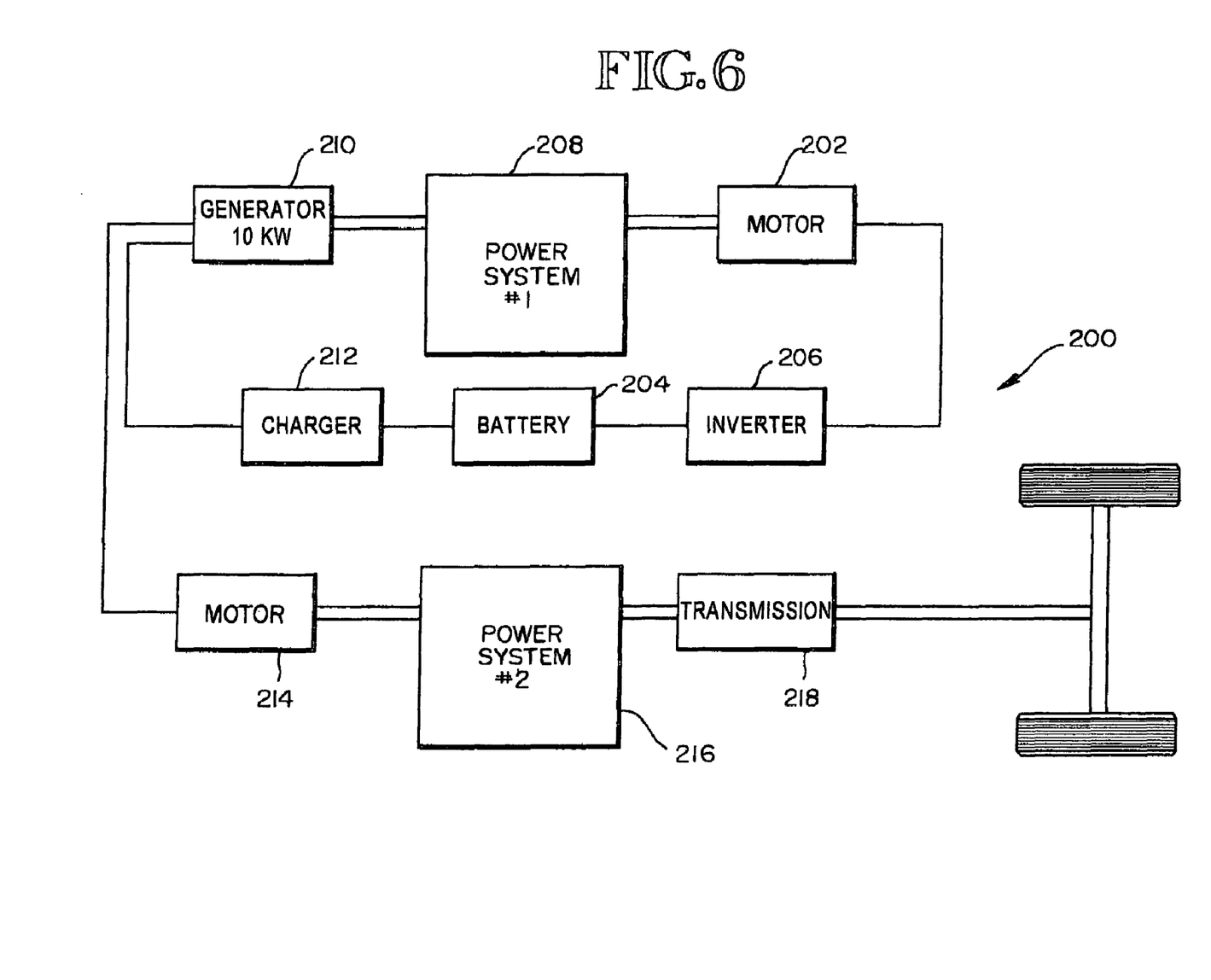
FIG. 6 is a diagram of an application of the system of the present invention involving a vehicle.
Figure 7:
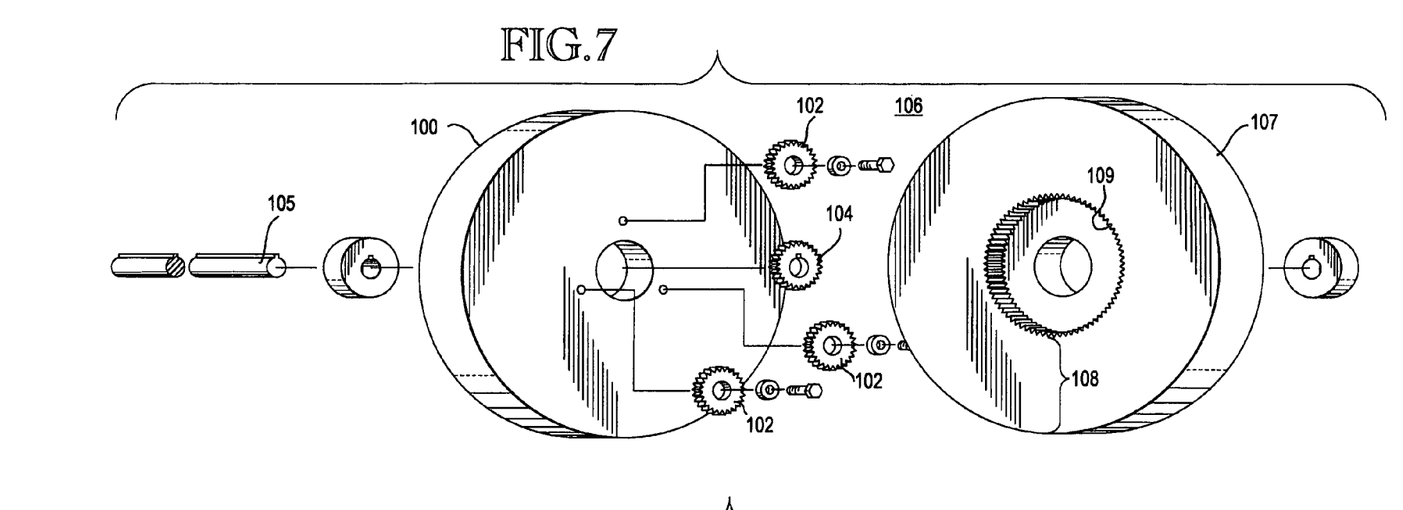
FIGS. 7-11 show different embodiments of the system of FIGS. 1-5.

Now more particularly, referring to FIG. 7, a gear arrangement is shown with one power disc 100, involving three outer drive gears 102-102 and a central gear 104 which is mounted on a system drive shaft 105. In this embodiment, the three drive gears 102 are the same size as the central gear, but are considerably smaller than in the system shown in FIGS. 1-6. In order to properly drive this arrangement, the rear side 106 of the previous power disc 107 has a wide rim portion 108, with a set of drive teeth 109 arranged around the periphery of the inner surface of the rim portion 108. The rim portion 108 is wide enough to mate with the small outer drive gears 102-102. In this example, the diameter of the inner (teethed) surface of power disc 107 is slightly less than one-half of the outside diameter of the power disc.

Figure 8:
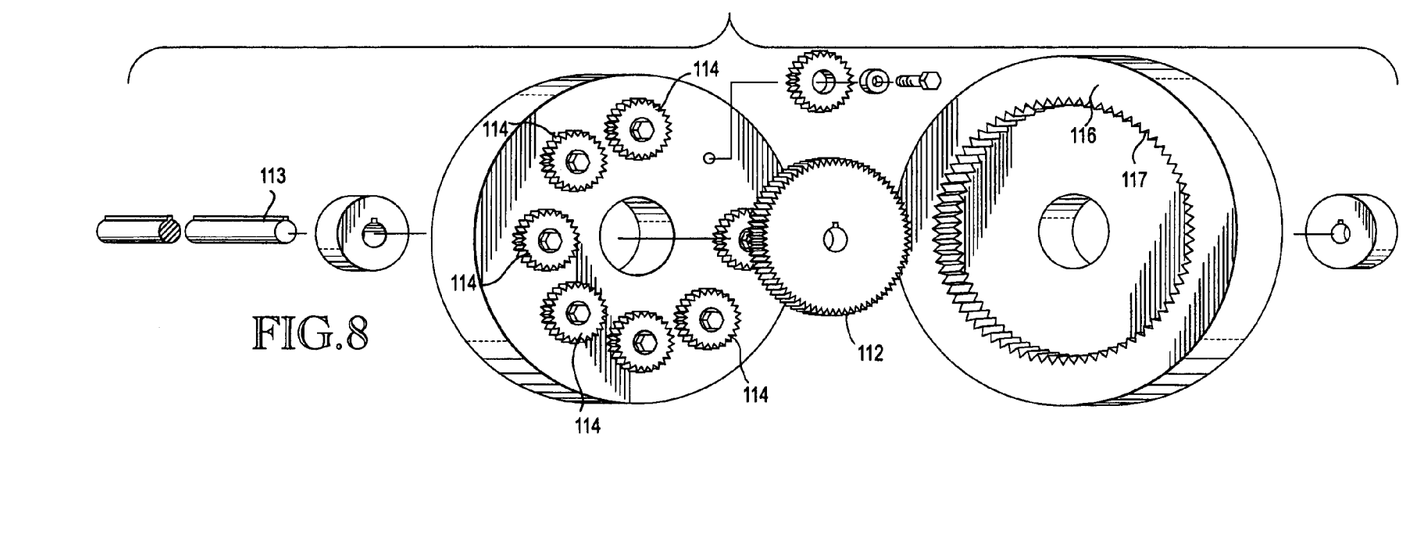

FIG. 8 shows another variation of a gearing/power disc arrangement, involving a large central gear 112 mounted on the central drive shaft 113, and a plurality of outer driving gears 114-114 rotationally mounted to surface 113 of power disc 115, which is also rotatably mounted relative to the central shaft. In the embodiment shown, there are a total of eight outer driving gears 114-114, although this number could be varied. In this arrangement, each power disc has a relatively narrow rear surface rim 116, on the interior surface of which is a set of teeth 117 which mate with and drive the outer driving gears 114-114 on the next power disc.

As illustrated on FIGS. 7 and 8, the outer driving gears/central gear may be of various sizes; however, the rear-facing rim of the previous power disc must be configured so that the rim teeth can mate with the outer driving gears on the subsequent power disc. A particular gear arrangement may be used for the entire string of power discs, or the gear arrangement could differ from disc to disc. Further, the power discs could vary in size. This all results in different transfers of power between input and output.

Figure 9:
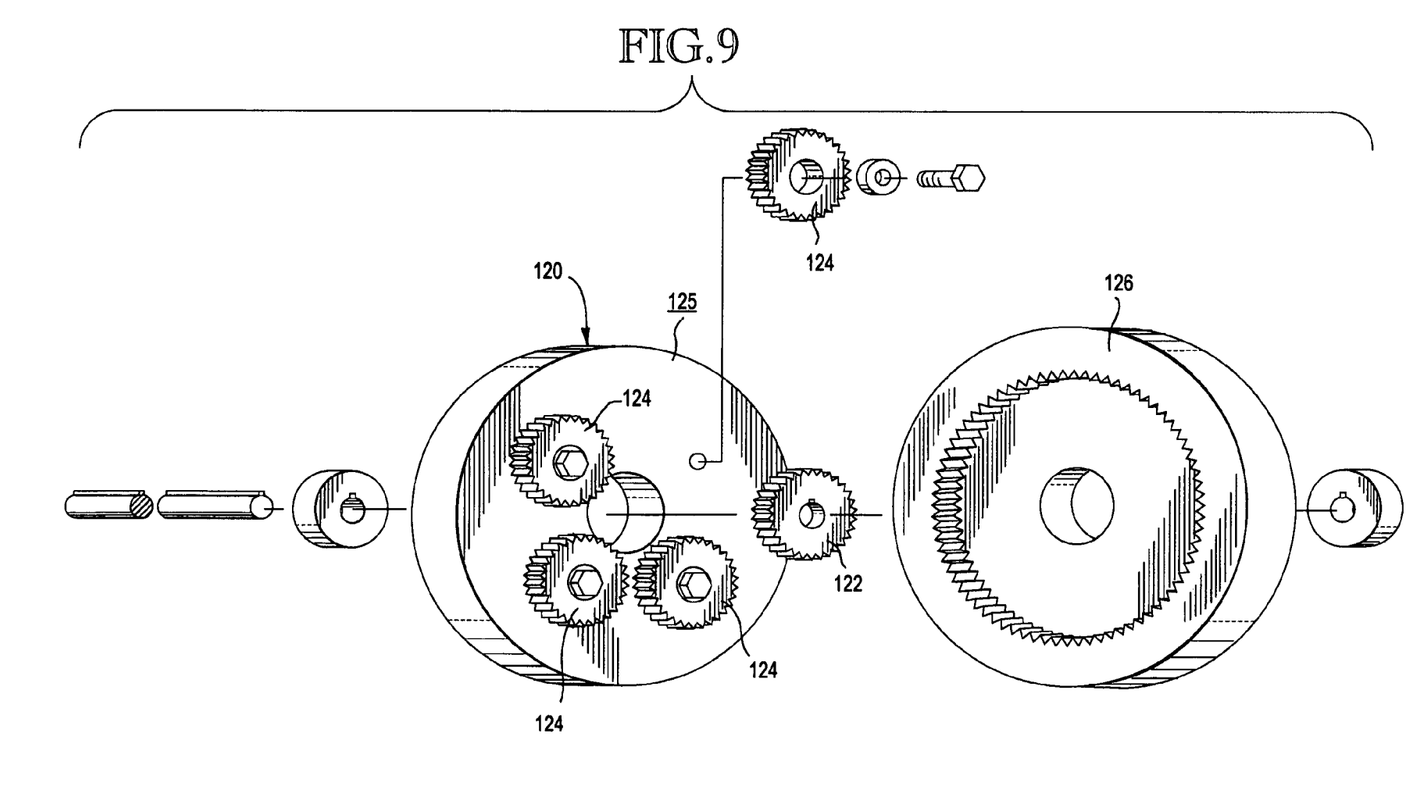

Still another gear arrangement is shown FIG. 9. In this embodiment, power disc 120 has four driving gears 124-124 rotatably mounted to surface 125 and cooperating with a central gear 122. The rear side rim 126 of each power disc is relatively wide, mating with the outer drive wheels 124-124 on the next power disc. In this arrangement, the diameter of the rear side rim is approximately ¾ of the outside diameter of the power disc. This arrangement thus is between the embodiments of FIGS. 7 and 8 relative to rim width.

In the embodiments of FIGS. 7-9, only two power discs are shown and only one gear arrangement. It should be understood that a system could include (and likely would) a plurality of power discs and associated gear arrangements. Each such system would include an input power disc and an output power disc, as discussed above with respect to FIGS. 1-5.

Figure 10:
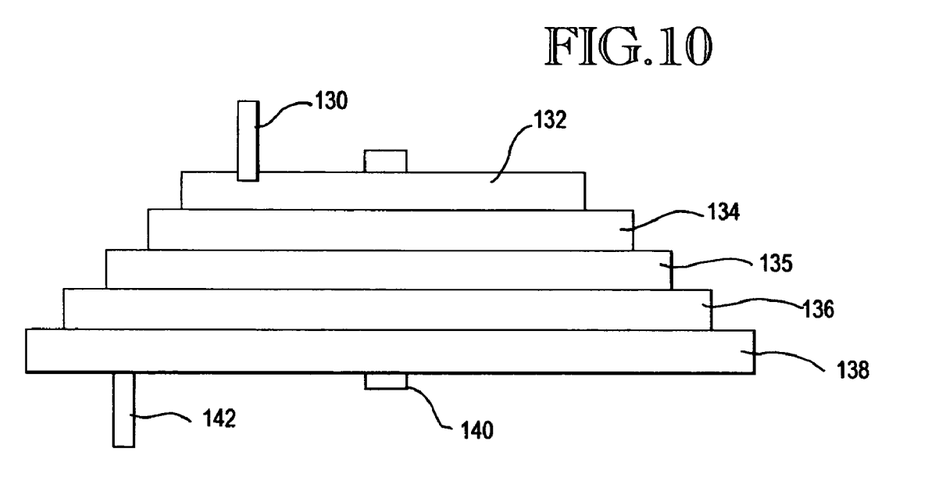

FIG. 10 shows another arrangement of the present invention which includes a vertical stacked arrangement of power discs. FIG. 10 includes an input power shaft 130 responsive to, for instance, an input motor (not shown) for driving first input power disc 132 and then successive power discs 134, 135 and 136, as shown, and then output power disc 138. All of the power discs rotate about a central support shaft 140. The output power disc 138 drives an output power shaft 142. FIG. 10 shows successive power discs having a gradually increasing diameter. It should be understood that the power discs could all have the same diameter. The arrangement of the outer driving gears and the central gear in FIG. 10 is not specifically shown; various arrangements, including those discussed above, can be used.

It should be understood that the input power shaft and the output power shaft can be reversed in FIG. 10, specifically, that output power shaft 142 of FIG. 10 could be the input power shaft in another embodiment with the input power shaft 130 being an output power shaft. FIG. 10 further shows that different power disc sizes can be used, as well as the input and output being reversed, depending upon the desired speed of rotation and the desired power levels between the input and the output.

Figure 11:
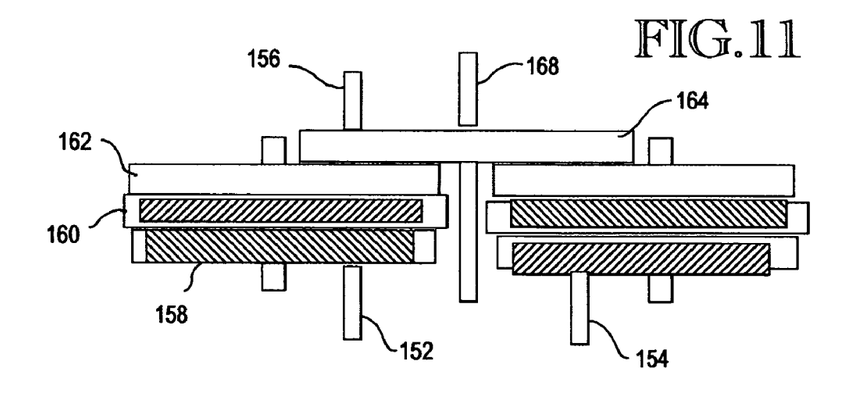

FIG. 11 shows another vertically stacked power disc arrangement, generally shown at 150. In this vertical arrangement, which could also be horizontal, dual power input shafts 152 and 154 are shown with a single power output shaft 156. In this arrangement, each input shaft, for instance input shaft 152, drives an associated input power disc, for instance power disc 158. The input power disc is followed by two intermediate power discs 160 and 162. There could be more. The last intermediate power disc 162 drives a single output power disc 164. The output power disc 164 is mounted for rotation about a central support shaft 168.

The input power discs and the two intermediate power discs are all mounted for rotation about their own support shafts. The power discs in FIG. 11 differ in size, but they could all be made the same size. Further, while FIG. 11 shows a dual power input and a single output, the arrangement could be reversed to provide for a single power input with dual power outputs.

Hence, a mechanical system has been disclosed which provides a high power efficiency or power advantage from the input end to the output end thereof. The system can be arranged such that the output speed of the system is higher or lower than the input speed (i.e. the motor speed). Further, as shown above, various arrangements can be utilized to produce specific desired results.

Figure 12:
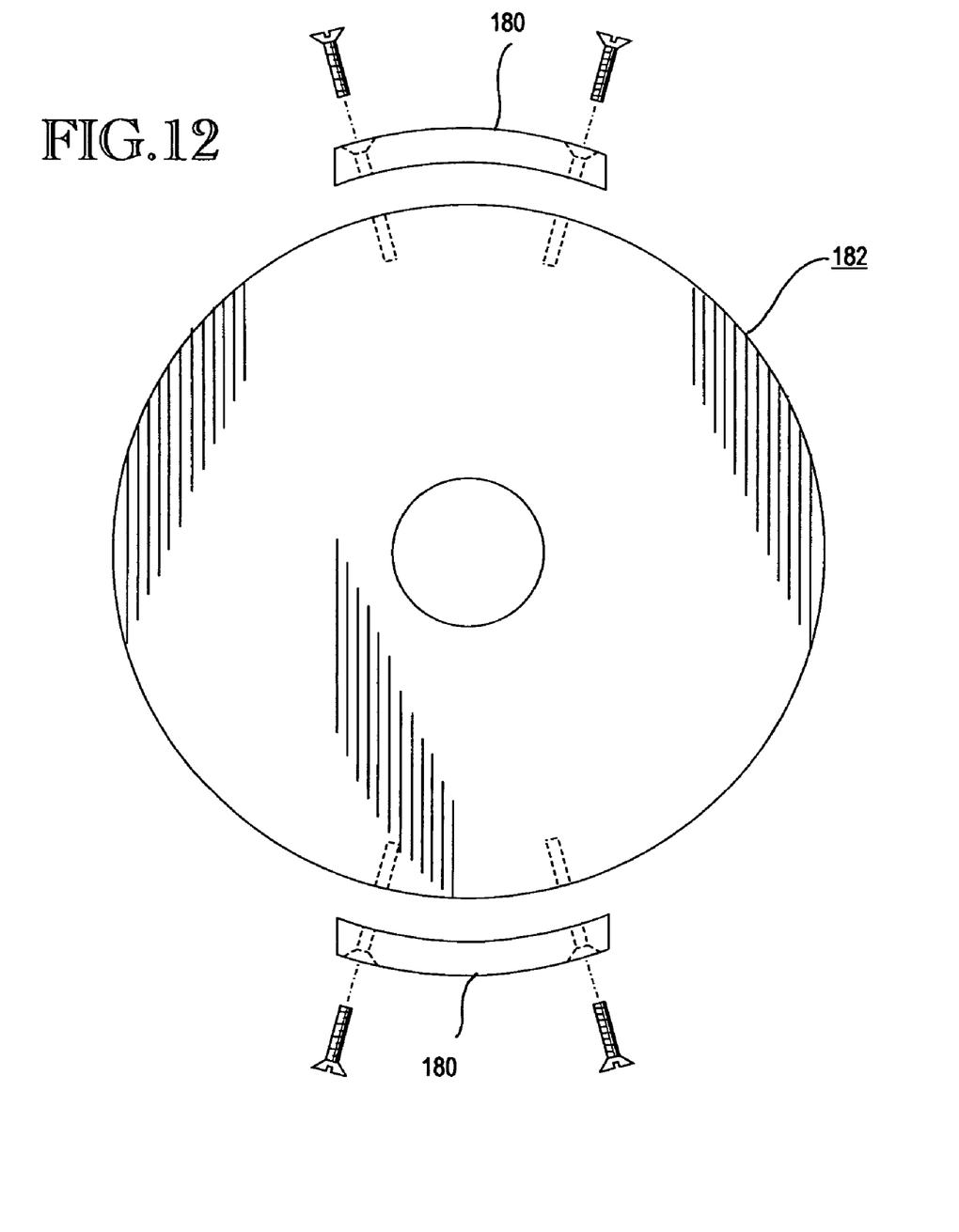
FIG. 12 is a partially exploded view showing a feature of present invention.

FIG. 12 shows a further variation to the power discs shown and described herein. This variation includes attaching weights 180 (such as lead weights) to the rim surface 182 of one or more of the power discs in the system. A minimum of two weights are used, 180° apart on the rim. Additional weights can be used, in pairs, each 180° apart. Weights can be used all the way around the rim, if desired. Typically, the weights will be bolted to the rim surface, but other attachment means can be used. The weights may vary in configuration and weight, from several ounces to several pounds. Operation of the system is enhanced by use of the weights.

FIG. 6 shows a vehicle application for the system of the present invention. The vehicle 200 includes a conventional AC electric motor 202, which is run by a vehicle battery 204 through an inverter 206 which is part of the vehicle control system, which produces the required AC voltage to run motor 202 from a DC voltage provided by the battery. The power source could also be a gas or diesel engine system as well. The output of motor 202 is applied to a system of the present invention, shown generally at 208, which results in a power advantage, the output of which is applied to a conventional generator 210. One output from generator 210 is applied to a charger 212 in the control system, which charges the vehicle battery 204, which in turn then continues to run the engine 202. This circuit provides the electric power for the vehicle.

The other output from generator 210 is directed to a second electric motor 214, the output of which is applied as a drive to a second power system of the present system 216. Power system 216 provides another power advantage used to drive the vehicle in standard use by transmission 218. The system of FIG. 6 can be a self-sustaining vehicle system, requiring minimal if any additional power, due to the use of the two onboard power systems of the present invention 208 and 216. In case battery 204 needs an additional power recharge on occasion, conventional sources of electric power can be used for such recharging. However, even if such recharging is necessary from time to time, the vehicle of FIG. 10 using the present invention is still extremely efficient, relative to the electric power use from the conventional power grid required by a conventional electric car.

The control system can manage the power generated by the generator 210 and direct it as needed to the charging system for the battery 204 or the second electric motor 214. Since the power system 208 will typically be operated at full speed, power could be directed to charging the battery when the vehicle is stopped. The size and scale of the components could be optimized for various uses and vehicles.

It should also be understood that various intermediate gears can be incorporated between each power disc assembly in order to change gear ratios, speed or size of the next power disc. Also, while the power discs shown herein are round, the discs may have shapes other than round.

It should further be understood that the present invention could be used with power sources other than electric motors, including gas or diesel engines or engine/generator combinations. Further, the system could be used as part of a wind turbine system or a hydroelectric turbine system to increase overall yield of such systems.

Although a preferred embodiment has been disclosed for purposes of illustration, it should be understood that various changes and modifications and substitutions could be made in the preferred embodiment without departing from the spirit of the invention as defined by the claims which follow:

What is claimed is:

1. A mechanical power system, comprising:
   at least two power disc elements mounted for rotation about a central axis;
   a first system gear, mounted on a first system shaft which is offset from the central axis, wherein the first power disc element includes a first peripheral gear portion in the vicinity of a rear rim thereof for mating with the first system gear, wherein the first power disc element has a second peripheral gear portion in the vicinity of a forward rim thereof, and wherein the second power disc element has a plurality of outer gear members rotatably mounted to a rear surface thereof and positioned to mate with the second peripheral gear portion on the first power disc element, wherein the second peripheral gear portion on the first power disc element has a diameter which is substantially less than an outside diameter of the first power disc element;
   a central gear which is mounted so as to be fixed relative to the central axis and which is further mounted to mate with the outer drive gears on the second power disc element, such that rotation of the first system gear results in rotation of the first and then the second power disc element; and
   a second system gear mating with a forward peripheral gear portion of the second power disc element, located in the vicinity of the rim of the second power disc element, the second system gear mounted on a second system shaft which is offset from the central axis, wherein in operation a power change results between the first and second system shafts in operation of the mechanical power system.

2. The mechanical power system of claim 1, wherein the outer drive gears and the central gear are the same size.

3. The mechanical power system of claim 1, wherein the diameter of the second peripheral gear portion is no greater than one-half of the outside diameter of the first power disc element.

4. The mechanical power system of claim 1, including at least one pair of opposed weights mounted to an exterior rim surface of at least one of the power disc elements.

5. The mechanical power system of claim 1, including at least one intermediate power disc element positioned between the said two power disc elements, the intermediate power disc elements each having a forward peripheral rim portion for making with driving a plurality of outer drive gear members mounted to the next successive power disc element and a central gear element mounted so as to be fixed to the central axis and to mate with the associated plurality of outer drive gears mounted on the next successive power disc element.

6. A mechanical power system, comprising:
   at least two power disc elements mounted for rotation about a central axis, wherein the first power disc element includes a first peripheral gear portion in the vicinity of a rear rim thereof;
   a first system gear, mounted on a first system shaft, which is offset from the central axis, the first system gear adapted to mate with the first peripheral gear portion;
   wherein the first power disc element has a second peripheral gear portion in the vicinity of a forward rim thereof, and wherein the second power disc element has a plurality of outer drive gear members rotatably mounted to a rear surface thereof and positioned so as to mate with the second peripheral gear portion on the first power disc element;
   a central gear which is mounted so as to be fixed relative to a central axis, and which is further mounted to mate with the outer drive gears on the second power disc element, wherein the central drive gear has a substantially greater diameter than the outer drive gears; and
   a second system gear mating with a peripheral gear portion of the second power disc element, located in the vicinity of the rim of the second power disc element, the second system gear mounted on a second system shaft which is offset from the central axis, wherein in operation a power change results between said first and second system shafts in operation of the mechanical system, regardless of whether the first system shaft is an input shaft and the second system shaft is an output shaft and vice versa.

7. A power system of claim 6, including at least one intermediate power disc element positioned between said two power disc elements, the intermediate power disc elements each having a forward peripheral rim portion for mating with and driving a plurality of outer drive gear members mounted on the next successive power disc element and an associated central drive gear element mounted so as to be fixed to the central axis and to mate with the associated plurality of outer drive gear members mounted on the next successive power disc element.

8. The mechanical power system of claim 6, including at least eight outer drive gear members associated with at least one power disc element.

9. The mechanical power system of claim 6, wherein the diameter of the central drive gear is approximately at least four times the diameter of the outer drive gear members.

10. The mechanical power system of claim 5, including at least one pair of opposed weights mounted to an exterior rim surface of at least one of the power disc elements.

11. A mechanical power system, comprising:
    at least two sets of at least two power disc elements, said two sets of power disc elements, respectively, mounted for rotation about first and second mounting axes, wherein the first power disc element in each set includes a first peripheral gear portion in the vicinity of a rear rim thereof;

a first system gear for each set of power disc elements mounted, respectively, on first and second system shafts, which are offset from said first and second mounting axes, wherein the first system gear for each power disc set mates with the first peripheral gear portion of the first power disc element of each power disc set;

wherein the first power disc element of each set has a second peripheral gear portion in the vicinity of a forward rim portion thereof, and wherein the second power disc element in each set thereof has a plurality of outer drive gear members rotatably mounted to a rear surface thereof and positioned so as to mate with the second peripheral gear portion on the first power disc element of each set;

a central gear for each set, mounted so as to be fixed relative to the respective mounting axes and further mounted to mate with the outer drive gears on the second power disc element;

a second system gear for each set, mounted on first and second system shafts which are offset from said first and second mounting axes, wherein the second system gear mates with a forward peripheral gear portion of the second power disc element of each set; and a single input/output power disc element mounted about a central axis, and having a gear configuration which mates with the second system gears from each set of power disc elements, such that rotation of the first and second system axes results in rotation of the input/output power disc element, and vice versa.

12. The power system of claim 11, wherein the power disc elements in the respective sets are of different sizes.

13. The power system of claim 11, including at least one intermediate power disc positioned between said two power disc elements in each set, wherein the intermediate power disc elements each have a forward peripheral rim portion for mating with and driving a plurality of outer drive gear members mounted on the next successive power disc element in the set and an associated central drive gear element mounted to be fixed to the first and second axes, respectively, and to mate with the associated plurality of outer drive gear members, mounted on the next successive power disc element.

14. The mechanical power system of claim 11, including at least one pair of opposed weights mounted to an exterior rim surface of at least one of the power disc elements.

15. A mechanical power system, comprising:

at least two power disc elements mounted for rotation about a central axis, wherein the first power disc element includes a first peripheral gear portion in the vicinity of the rim thereof;

at least one pair of opposed weights mounted to an exterior rim surface of at least one of the power disc elements;

a first system gear, mounted on a first system shaft which is offset from the central axis for mating with the first power disc element;

wherein the first power disc element has a second peripheral gear portion in the vicinity of a forwardly extending rim portion thereof, and wherein the second power disc element has a plurality of outer drive gear members rotatably mounted to a rear surface thereof and positioned so as to mate with the second peripheral gear portion on the first power disc element;

a central gear which is mounted so as to be fixed relative to the central axis and which is further mounted to mate with the outer drive gears on the second power disc element; and a second system gear mating with a peripheral gear portion of the second power disc element, located in the vicinity of the rim of the second power disc element, the second system gear mounted on a second system shaft which is offset from the central axis, wherein in operation a power change results between first and second system shafts or vice versa in operation of the mechanical power system.

* * * * *